UNITED STATES PATENT OFFICE.

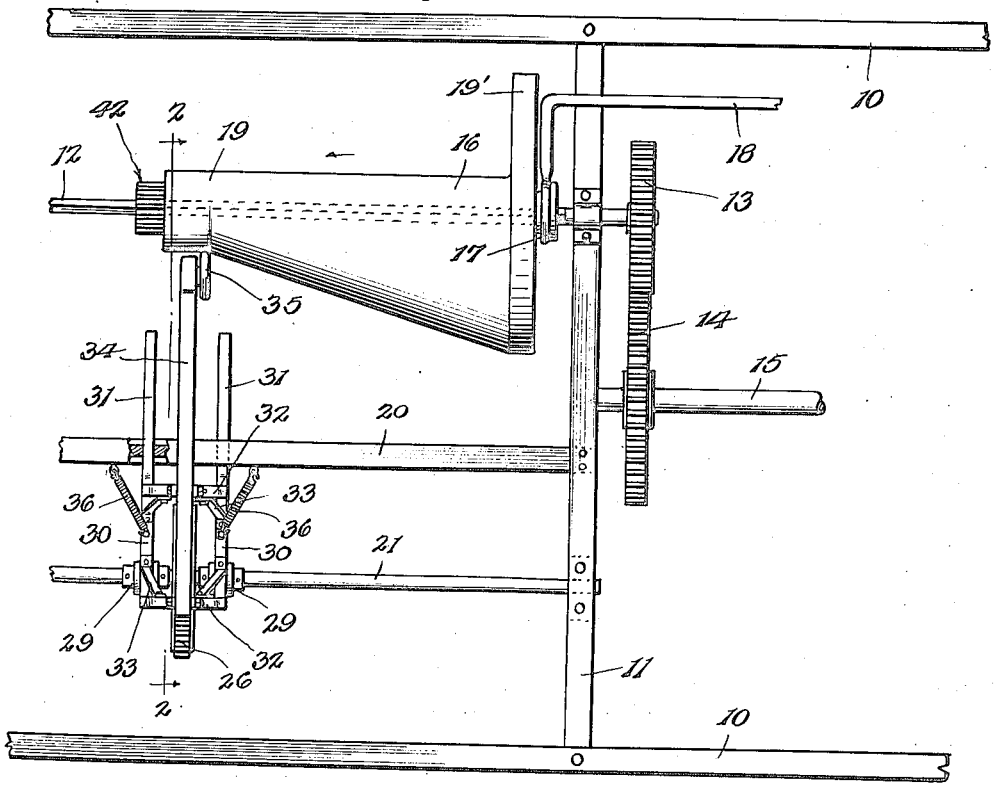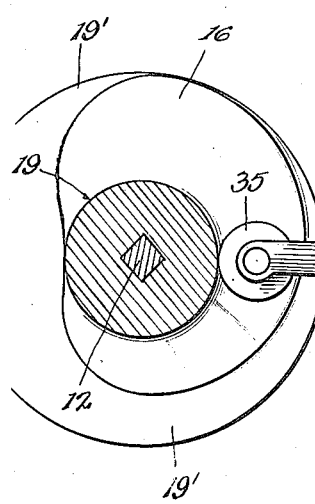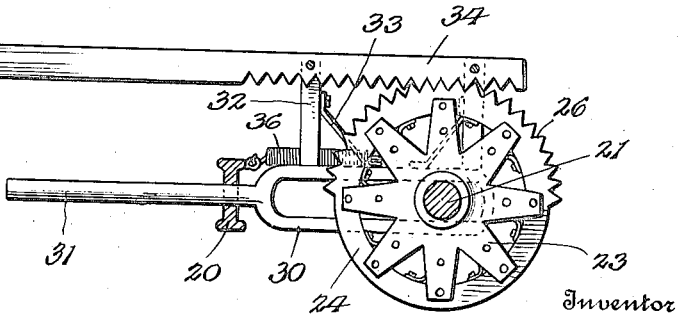

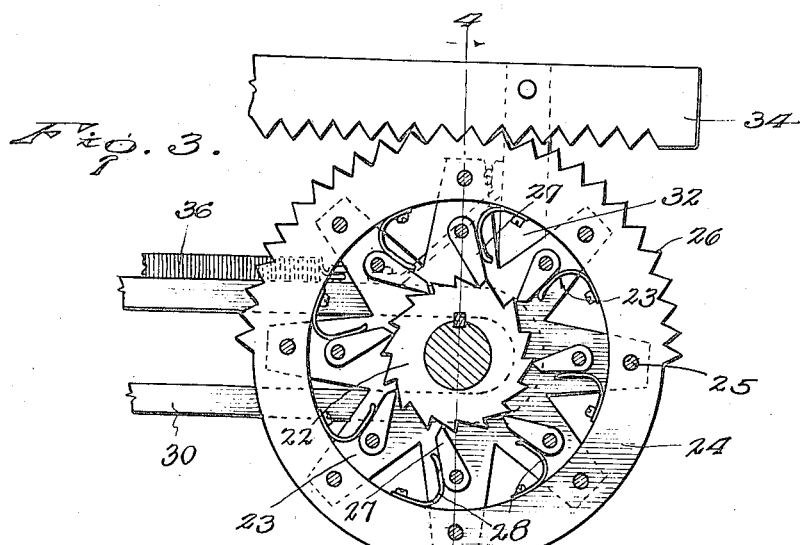
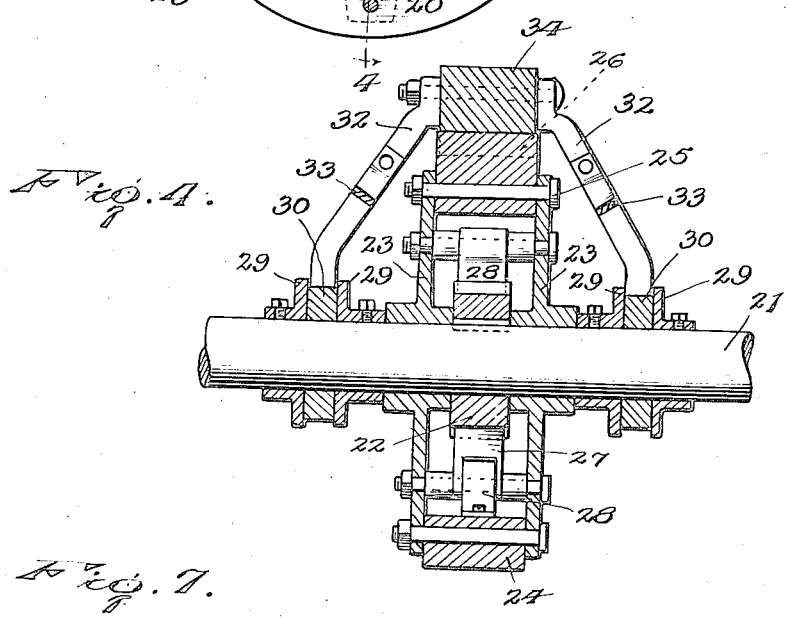
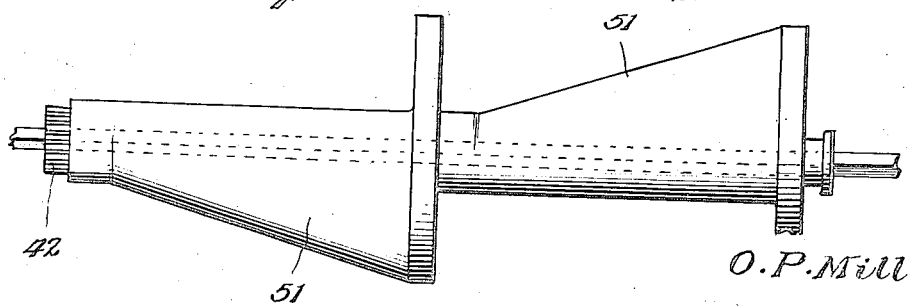

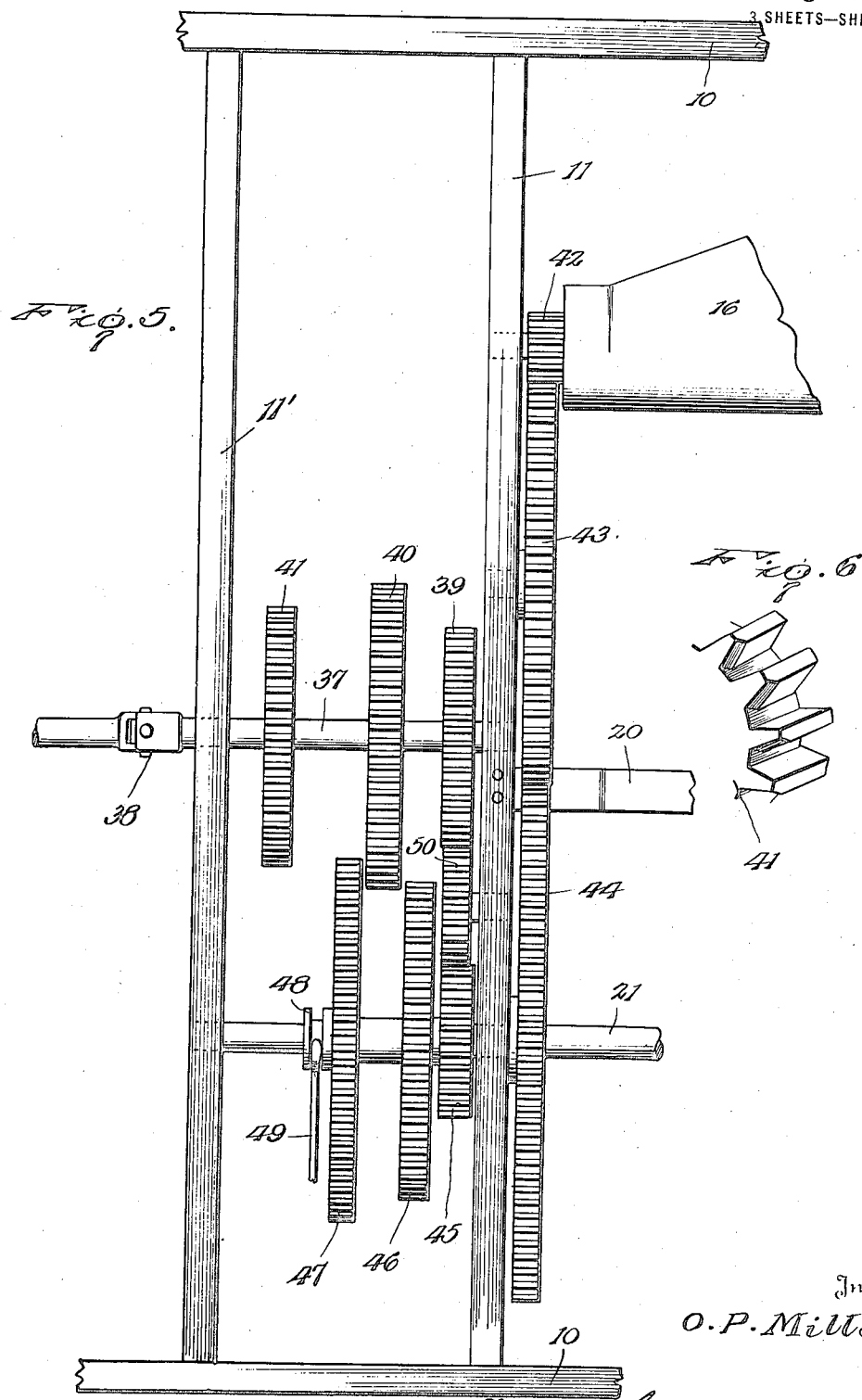

OLIN P. MILLER, OF WOODLAND, GEORGIA.

TRANSMISSION.

1,427,223.

Specification of Letters Patent. Patented Aug. 29, 1922.

Application filed January 12, 1922. Serial No. 528,745.

*To all whom it may concern:*

Be it known that I, OLIN P. MILLER, a citizen of the United States, residing at Woodland, in the county of Talbot and State of Georgia, have invented certain new and useful Improvements in Transmissions, of which the following is a specification.

This invention relates to an improved transmission and seeks, as one of its principal objects, to provide a mechanism for transmitting from a drive shaft to a driven shaft, uniform speed at any given ratio.

A further object of the invention is to provide a mechanism for transmitting uniform speed from a drive shaft to a driven shaft without any loss of power by slipping or failure of the drive shaft and driven shaft being in direct driving connection.

And the invention has as a still further object to provide a mechanism wherein it will be possible to change the ratio of speed between the drive shaft and driven shaft while both are in motion and at any speed or any varying speed, without any disconnection, slipping, or loss of power.

Other and incidental objects will appear hereinafter.

In the drawings:

Figure 1 is a plan view of my improved transmission.

Figure 2 is a section on the line 2—2 of Figure 1, looking in the direction of the arrows.

Figure 3 is an enlarged section of the ratchet employed.

Figure 4 is a section on the line 4—4 of Figure 3, looking in the direction of the arrows.

Figure 5 is an enlarged fragmentary plan view showing the gearing employed at the rear ends of the drive and driven shafts of the transmission.

Figure 6 is a fragmentary perspective view illustrating the beveling of certain of the gears employed, and Figure 7 is a side elevation showing a modified form of drive cam.

As shall presently appear, the transmission of the present invention is well adapted for a wide range of use, such, for instance, as in conjunction with motor vehicles or motor boats and, in fact, is adaptable in any instance where a direct variable gear is necessary to accomplish the desired results. I have accordingly, in the drawings, not attempted to show the transmission as applied to any specific use since the function of the transmission will always be the same regardless of the particular adaptation in which it is employed.

In carrying the invention into effect, I employ a supporting frame comprising side bars 10 between which are arranged, as shown in Figures 1 and 5, spaced cross bars 11 and a third cross bar 11'. Journaled upon the cross bars 11 is a squared drive shaft 12 provided at one end with a drive gear 13 and coacting with said gear is a similar gear 14 upon a power shaft 15. Coacting with the squared drive shaft, but freely slidable thereon, is a drive cam 16 provided at its forward end with a collar 17 and coacting with said collar is a shifting yoke 18. Any approved means may be provided in conjunction with this yoke for adjusting the cam longitudinally on the shaft 12 and locking the cam in adjusted position. As particularly shown in Figure 1 of the drawings, the cam is tapered longitudinally and is provided at its rear end with a cylindrical portion 19 concentric to the shaft 12, while at its forward end the cam is formed with a cylindrical portion 19' of a radius equal to the major radius of the cam.

Extending between the cross bars 11 in parallel relation to the bars 10 is a bar 20, and journaled upon the bars 11 in parallel relation to the bar 20 is a driven shaft 21. The driven shaft 21 and bar 20 are journaled below bars 11 for a distance equal to the radius of the annulus 24 shown in Fig. 3, so that the rack 34 is in the same plane as bars 10 and 11. Associated with shaft 21 is a ratchet. As particularly shown in Figures 3 and 4, the ratchet comprises a ratchet pinion 22 fixed to the shaft, and loosely mounted upon the shaft at opposite sides of said pinion are hub plates 23 each having a plurality of spokes. Mounted between the spokes of said plates is an annulus 24 secured upon the spokes by bolts 25 to form a ratchet wheel surrounding the pinion. The annulus 24 is provided throughout a portion of its periphery with gear teeth 26 and pivoted between the spokes of the plates 23 are pawls 27 held to coact with the pinion 22 by springs 28 secured to the inner periphery of the annulus 24. In the present instance, I have shown the use of eight of the pawls 27 stepped, as indicated in Figure 3, each behind an other. However, by increasing the number of teeth on the pinion 22, any approved number of pawls may be employed so that, by stepping the pawls each behind an other, the lost motion between the ratchet wheel and the pinion will be negligible. Fixed to the shaft 21 at opposite sides of the ratchet wheel are pairs of spaced collars 29 and slidable upon the shaft at right angles thereto between the pairs of said collars respectively are yokes 30 provided at their inner ends with tail rods 31 slidable through the bar 20. Rising from the yokes are pairs of upwardly converging arms 32 held by braces 33 and mounted between said arms at their upper ends is a rack bar 34 bolted or otherwise secured to the arms. The rack bar is thus supported over the ratchet wheel to coact with the gear teeth 26 thereof and mounted upon the bar at its inner end is a roller 35 to coact with the drive cam 16. Secured at their outer ends to the yokes 30 and at their inner ends to the bar 20 are springs 36 holding the roller against the face of the cam.

As will now be understood in view of the preceding description, when the cam 16 is disposed in the position shown in Figure 1 so that the cylindrical portion 19 of the cam coacts with the roller 35 of the rack bar 34, no longitudinal movement will be imparted to the rack bar. However, by shifting the cam rearwardly along the drive shaft 12, the cam will be caused to coact with said roller for shifting the rack bar longitudinally in one direction while the springs 36 will act to return the rack bar as the cam revolves. Accordingly, the rack bar will be reciprocated for oscillating the ratchet wheel so that the pawls 32 will, in turn, be caused to coact with the ratchet pinion 22 for rotating the driven shaft 21. Thus, the driven shaft will be turned by the drive shaft and by further shifting the drive cam 16 rearwardly so as to cause the roller 35 to coact with the larger end portion of the cam, the throw of the rack bar may be increased for thus changing the speed ratio between the drive and driven shafts. As will be perceived, this change of speed ratio may be accomplished while both of the shafts 12 and 21 are in motion and without breaking the driving connection between the shafts, it being possible to obtain, at any time, any desired speed ratio within the limits of the drive cam, by simply shifting the cam longitudinally.

Journaled at its forward end upon the rearmost cross bar 11 and the cross bar 11' is a propeller shaft 37 in which is preferably interposed an appropriate universal joint 38 and fixed on said shaft are gears 39, 40 and 41, respectively. Integrally formed on or otherwise secured to the cam 16 at its rear end is a gear 42 which will mesh with gear 43, which is journaled on the cross bar 11, when cam has been shifted to its highest part so that rollers 35 will idle on shoulders 19'. Fixed upon the shaft 21 to constantly mesh with the gear 43 is a gear 44 and slidable upon said shaft between the rear cross bar and the cross bar 11 are gears 45, 46 and 47. These gears are mounted upon a hub common to all thereof and this hub is formed to coact with the shaft 21, which is a squared shaft between bars 11 and 11', so that the gears will be turned by the shaft. Mounted upon the hub at its rear end is a collar 48 and coacting with said collar is a shifting yoke 49. Any approved means may be provided in conjunction with this yoke for adjusting the gears longitudinally on the shaft 21 and locking the gears in adjusted position. Journaled upon the rearmost of the bars 11 to constantly mesh with the gear 39 is a gear 50. The gear 47 is engageable with the gear 41 for driving the propeller shaft 37 at high speed. Similarly, the gear 46 is engageable with the gear 40 for driving the propeller shaft at intermediate speed, while the gear 45 is engageable with the gear 50 for counter-rotating the propeller shaft. A selective speed gearing between the shafts 21 and 37 is thus provided and, preferably, the teeth of the gears 40, 41, 45, 46, 47 and 50 are beveled at corresponding ends thereof, as shown in Figure 6, in order to facilitate the meshing of the gears. Similarly, the gear 42 is formed to mesh with the gear 43 and the teeth of these gears are likewise beveled.

As will now be understood in view of the foregoing, the cam 16 may be shifted rearwardly so as to ride the roller 35 of the rack bar 34 onto the cylindrical portion 19' of the cam, and, as illustrated in Figure 5, coincidently move the gear 42 of the cam into engagement with the gear 43. As will be appreciated, when the cylindrical portion 19' of the cam is brought into a position to coact with the roller of the rack bar, no longitudinal movement will be imparted to said bar. However, since the gear 42 will coincidently mesh with the gear 43, a gear connection will be established between the drive shaft and the driven shaft so that regardless of the shifting of the cam as indicated, the flow of power from the drive shaft to the driven shaft will be continuous. I accordingly provide an arrangement wherein after the high speed of the driven shaft is reached when driven by the cam and rack bar, a direct drive for the driven shaft may be established, and in this connection it should be observed that the highest cam driven speed of the driven shaft will be slightly less, or greater if preferred, than the speed of the said shaft when driven by the gears 42, 43 and 44, so that the gear 42 may be readily meshed with the gear 43.

It of course will be understood that the selection of gears operated by the yoke 49 will be made while cam 16 is in neutral position (when the cylindrical portion 19 of the cam is disposed as shown in Figure 1) and while shaft 38 is motionless. Then regardless of the gear selection made (45—50—39—reverse; 46—40—high; or 47—41—superhigh—these terms being used with view to the gear's application to a motor vehicle, for instance, or any other adaptation which might require a similar application) the shifting of the cam 16 rearwardly will give a higher ratio of speed between shafts 12 and 38, varying from neutral to the highest driving part of the cam 16 where the driving will then be accomplished by the meshing of gear 42 with gear 43.

In Figure 7 of the drawings, I have illustrated a slightly modified form of drive cam. In this modification, the drive cam is elongated to comprise diametrically disposed cam members 51 which are integrally joined and are each identical with the drive cam 16 as described in connection with the preferred form of the invention, with the exception that only the rearmost cam member carries a gear 42. Thus, in the modification, two rack bars, corresponding to the rack bar 34, and two ratchet wheels and pinions as indicated by Figures 2 and 3, will be employed, the rack bars being arranged to each co-operate with one of the cam members 51 respectively so that as one rack bar is caused to make its stroke, the other rack bar will be retracted. An overlap of the power strokes is considered desirable, and this is accomplished by forming the cam, as shown in Figure 2, with a driving surface exceeding 180 degrees. In this way power will be continuously applied to the driven shaft.

Having thus described the invention, what is claimed as new is:

1. In a transmission, a drive shaft, a driven shaft, a ratchet mechanism associated with the driven shaft, a longitudinally tapered driving cam fitted slidably upon the driving shaft and constrained to rotate therewith, said cam being provided at its ends with portions concentric to the driving shaft, and a reciprocatory bar having one end bearing constantly upon the circumferential surface of the cam and at its opposite end co-operating with the ratchet mechanism.

2. A transmission including a drive shaft, a tapered drive cam mounted upon said shaft to turn therewith but slidable along the shaft, a driven shaft, a ratchet pinion fixed upon the driven shaft, a ratchet wheel loose on the driven shaft having pawls coacting with said pinion, yokes slidable on the driven shaft, a rack bar supported by said yokes to engage the ratchet wheel, and yieldable means constantly holding the rack bar to coact with the cam whereby rotation of the cam will turn the driven shaft, the cam being shiftable for varying the driving ratio between said shafts.

3. In a transmission, a drive shaft, a driven shaft, and means for driving the driven shaft by the drive shaft comprising a cam adjustable longitudinally of the drive shaft for varying the driving ratio between said shafts, and means co-operating with the cam for establishing a direct gear connection between the drive and driven shafts in one extreme position of the cam.

4. In a transmission, a drive shaft, a driven shaft, ratchet mechanism associated with the driven shaft, a gear drive associated with said shaft, and a cam upon the drive shaft to operatively coact with said ratchet mechanism for driving the driven shaft and provided with a gear, the cam being adjustable to engage the gear thereof with said gear drive for driving the driven shaft.

5. In a transmission, a drive shaft, a driven shaft, a cam on the drive shaft provided at one end with a cylindrical portion and at its opposite end with a gear, ratchet mechanism associated with the driven shaft including a rack bar coacting with the cam, and a gear drive for the driven shaft, the cam being adjustable for disposing the cylindrical portion thereof to coact with said rack bar to render the ratchet mechanism inactive and simultaneously engage the gear thereof with said gear drive for turning the driven shaft.

In testimony whereof I affix my signature.

OLIN P. MILLER. [L. S.]